Aug. 28, 1923.
A. S. AEGERTER
1,466,261
CLINOMETER
Filed May 13, 1920
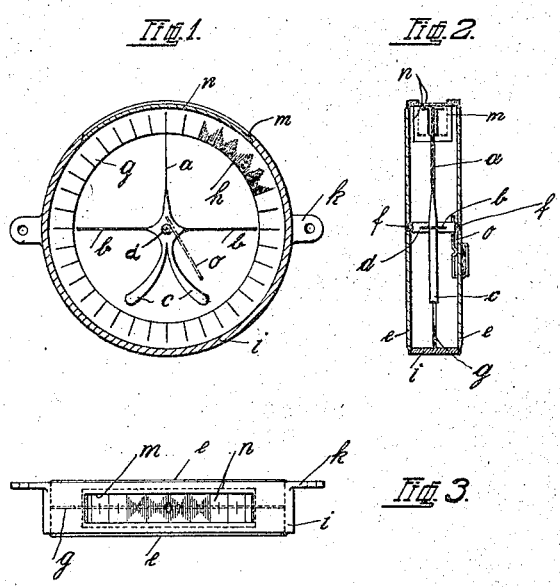

Patented Aug. 28, 1923.

1,466,261

UNITED STATES PATENT OFFICE.

AUGUST SAMUEL AEGERTER, OF BASEL, SWITZERLAND, ASSIGNOR OF ONE-HALF TO FRIEDRICH GRUNDER, OF RUTTI, SWITZERLAND.

CLINOMETER.

Application filed May 13, 1920. Serial No. 381,006.

*To all whom it may concern:*

Be it known that I, AUGUST SAMUEL AEGERTER, a citizen of the Swiss Confederation, and residing at Basel, Switzerland, have invented certain new and useful Improvements in Clinometers, of which the following is a specification.

This invention relates to clinometers and its main object is to provide an instrument which shall enable any inclination in relation to a vertical plane to be indicated with great accuracy.

To this end, a clinometer according to my invention comprises an indicating member that is mounted to swing about a horizontal axis in front of a scale, is normally held perpendicular by a weight and is provided with two vanes for damping its oscillations.

The apparatus can be used for a very large number of purposes, it may be built on to or into implements, instruments and the like, and is adapted for use by anyone requiring clinometric indications, for example by masons, carriage builders, engineers, builders of aircraft, architects and others.

The invention consists in the construction, arrangement and combination of parts described hereinafter and pointed out in the claims.

One embodiment of the invention is illustrated by way of example in the accompanying drawing, wherein:—

Figure 1 is a front elevation,

Figure 2 is a central vertical section, and

Figure 3 is a top plan view showing one form of clinometer according to my invention.

The apparatus comprises a pointer $a$ having two vanes $b$ for damping its oscillations and a bifurcated weight $c$ which normally maintains the pointer perpendicular. The pointer may be made in one piece or it may be built up of several parts and is mounted fast on an axle or arbor $d$ that is journaled by its pointed ends in two glass disks $e$ carried in a metal mount $i$. For reducing friction two jewels $f$ may be let into the glass disks $e$, but such stones need not be used.

In order to set the apparatus to any inclination or to accurately check any change in a given inclination there is provided between the two glass disks $e$ an annulus $g$ that is attached to the metal mount $i$ and has a circular scale $h$. As shown in Figure 1, the graduations are arranged in groups and increase and diminish in length in each group, for the purpose of facilitating reading the instrument. The vanes also serve as pointers. The upper or indicating end of the pointer $a$ is bifurcated to form two fingers which embrace the annulus $g$ and at their free ends are bent outwards just below a transparent disk $n$ which is let into the mount $i$ and closes an aperture $n$ in the same. This disk $m$ is graduated and thus enables the angle of inclination of the instrument to be read from above when this is more convenient. When building structures under water it may frequently happen that the instrument must be immersed in the water, in which event it would not be possible to read the instrument from the side, whilst it is quite possible to read it from above, this being more convenient particularly when the instrument is located near the ground. In the one glass $e$ is rotatably mounted a brake $o$ formed of bent wire embracing the two sides of the glass; by pressing this brake against the axle $d$ the pointer can be stopped at once and held in any desired position.

The mount $i$ may be provided with two lugs $k$, or more if desired, by means of which the instrument can be screwed on to implements or tools, such as a mason's level, straight-edge, or the like. Instead of being screwed on, the instrument can be built into such implements for determining inclination, such as straight-edges. In this case, for example, the instrument can be first placed on a working drawing suspended in the proper position, then the inclination of a line to be drawn can be determined through the glasses $e$, whereupon the instrument can be laid against the workpiece in the same position.

The external shape of the instrument need not be circular, of course.

I claim:—

1. A clinometer comprising a closed casing, having a circular mount, an annulus extending radially inwardly from the said mount and being provided with graduations on either side, two glass disks carried by the said mount, one at each side of the said annulus, a horizontal axle journalled in the said glass disks, a pointer carried by the said axle, and a brake pivotally mounted in one of the said glass disks and having means located exterior of said disk adapted to be pressed by hand against the said axle to thereby stop the pointer in any position.

2. The combination as set forth in claim 1, in which the said brake is formed of a bent wire embracing the two sides of the glass disk, and rotatably mounted therein.

3. The combination as set forth in claim 1, in which the said circular mount is provided with a peripheral aperture, and including a transparent graduated disk, closing said aperture so as to enable the reading of the angle inclination of above.

In testimony whereof, I affix my signature.

A. S. AEGERTER.